United States Patent [19]
Walsh et al.

[11] 3,886,487
[45] May 27, 1975

[54] ANTI-COLLISION SONAR SYSTEM

[75] Inventors: George M. Walsh, Middletown;
James W. Cummings; William R. Backman, Jr., both of Portsmouth;
Clifford, Peter J., Barrington, all of R.I.

[73] Assignee: Raytheon Corporation, Lexington, Mass.

[22] Filed: May 31, 1973

[21] Appl. No.: 365,819

[52] U.S. Cl. ............... 340/3 R; 340/3 D; 343/5 DP; 343/9; 343/112 CA; 343/100 CL
[51] Int. Cl. ................................................ G01s 9/68
[58] Field of Search ............ 340/1 R, 3 D, 3 F, 3 R; 343/100 CL, 5 DP, 9, 112 CA

[56] References Cited
UNITED STATES PATENTS

| | | | |
|---|---|---|---|
| 3,714,648 | 1/1973 | Bennett et al. | 343/5 DP |
| 3,740,705 | 6/1973 | Lowrance | 340/3 R |
| 3,786,405 | 1/1974 | Chramiec et al. | 340/3 R |

Primary Examiner—Richard A. Farley
Attorney, Agent, or Firm—David M. Warren; Joseph D. Pannone; Milton D. Bartlett

[57] ABSTRACT

A sonar system particularly adapted for navigating a ship in shallow waters employing a forwardly directed narrow sonar beam emanating from a projector assembly carried by the ship. The projector assembly is suitably positioned between the upper surface and lower surface of a body of water so that there is substantially no reverberation from waves at the upper surface and irregularities along the bottom for sufficient distances forward of the ship to present a clear view within the body of water. In one embodiment, the narrow beam is provided by a nonlinear finite amplitude interaction of two beams of sonic energy of relatively high frequency to provide a low frequency highly directive beam. In a second embodiment, a second sonar which measures depth and doppler quantities is coupled together with the forward looking sonar to provide a space stabilized display of data obtained with the forward looking sonar.

25 Claims, 9 Drawing Figures

PATENTED MAY 27 1975 3,886,487

SHEET 1

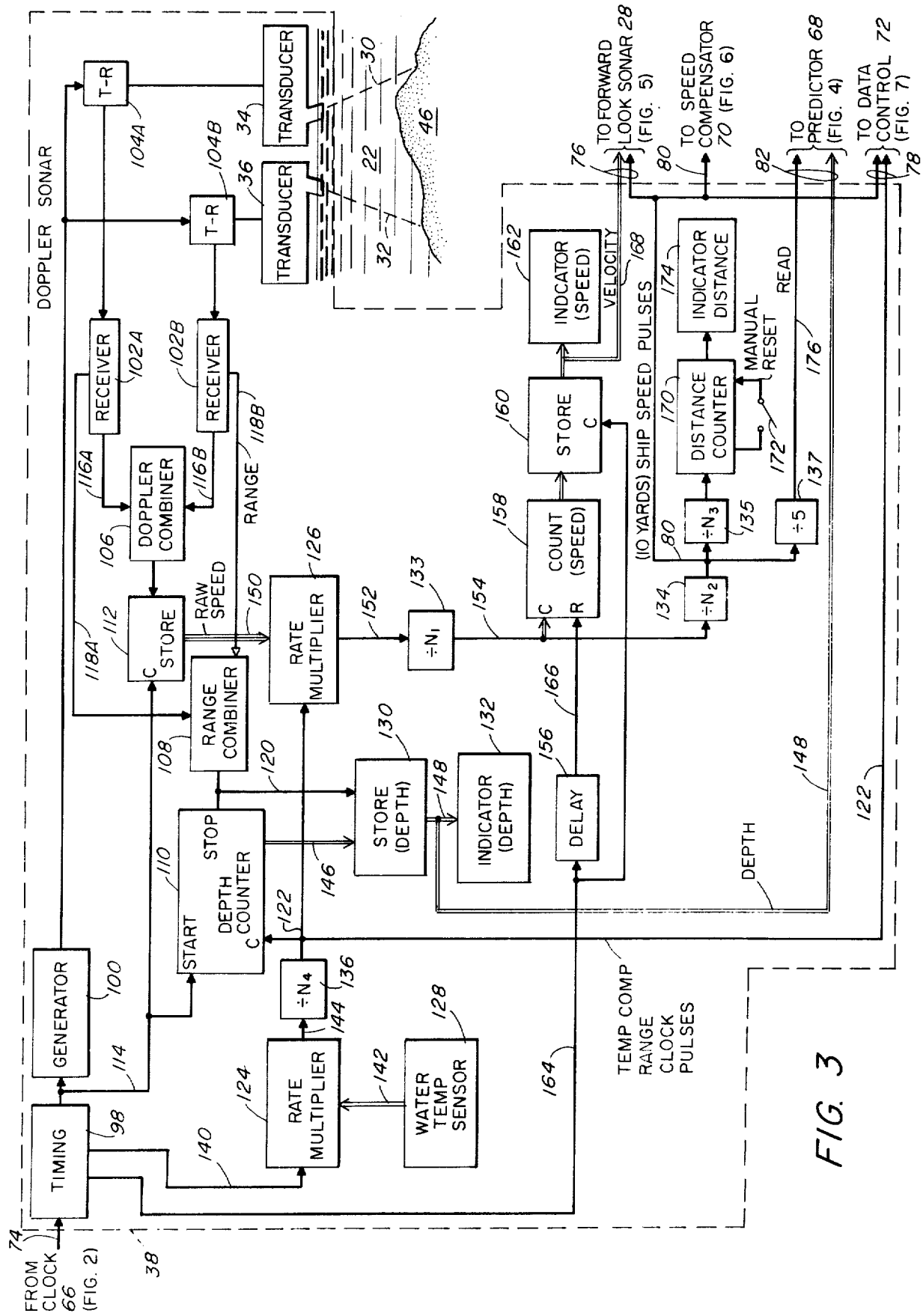

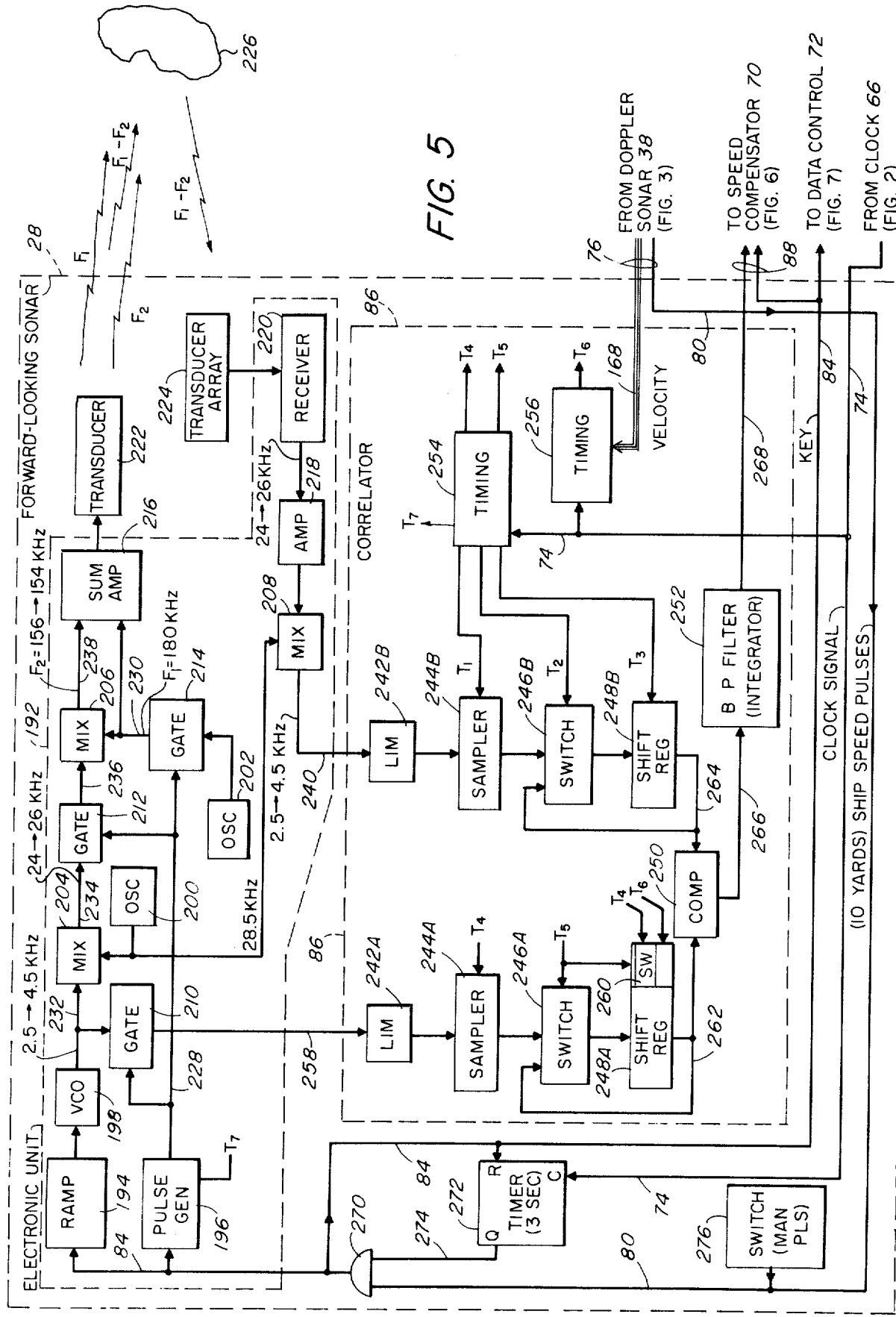

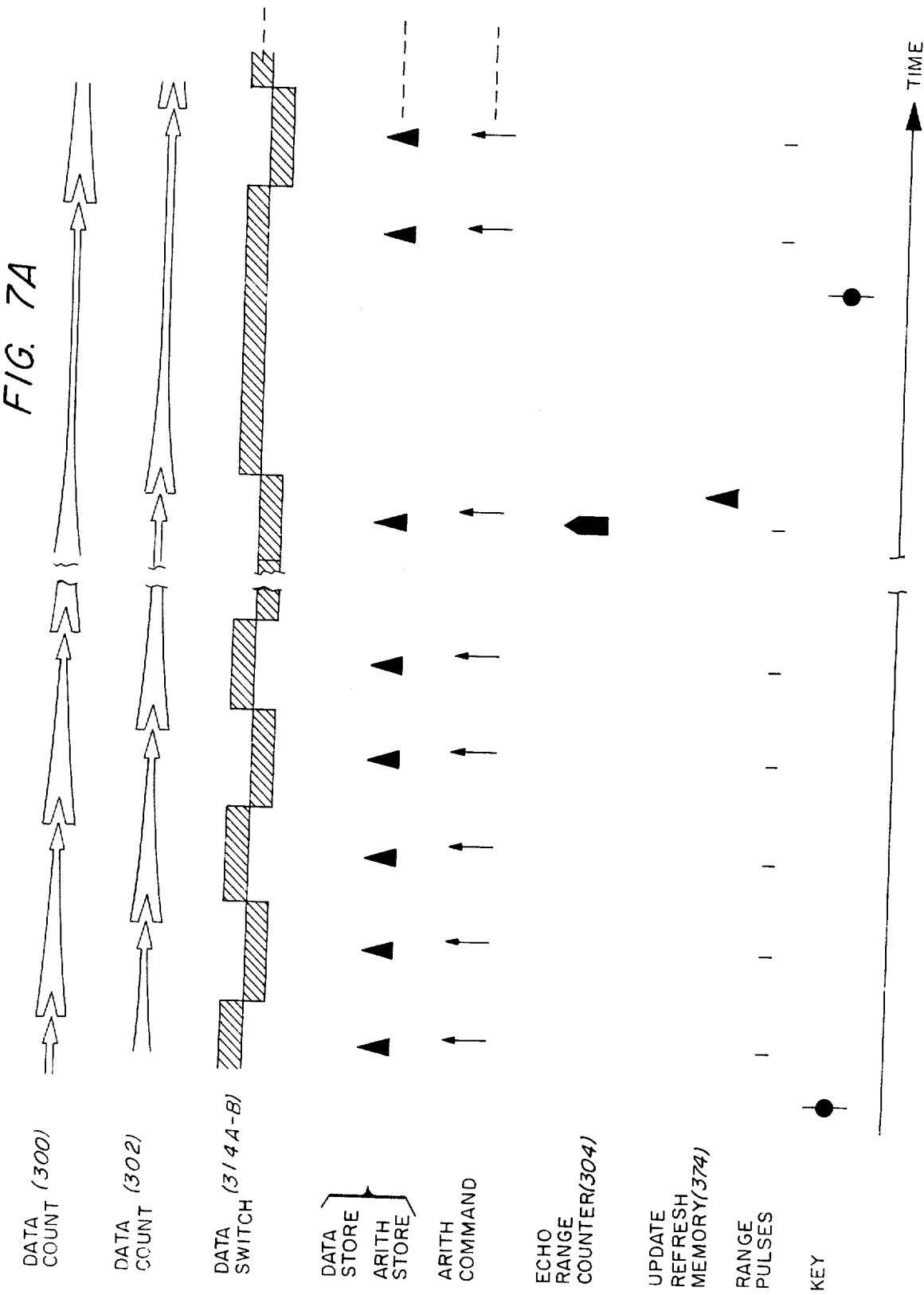

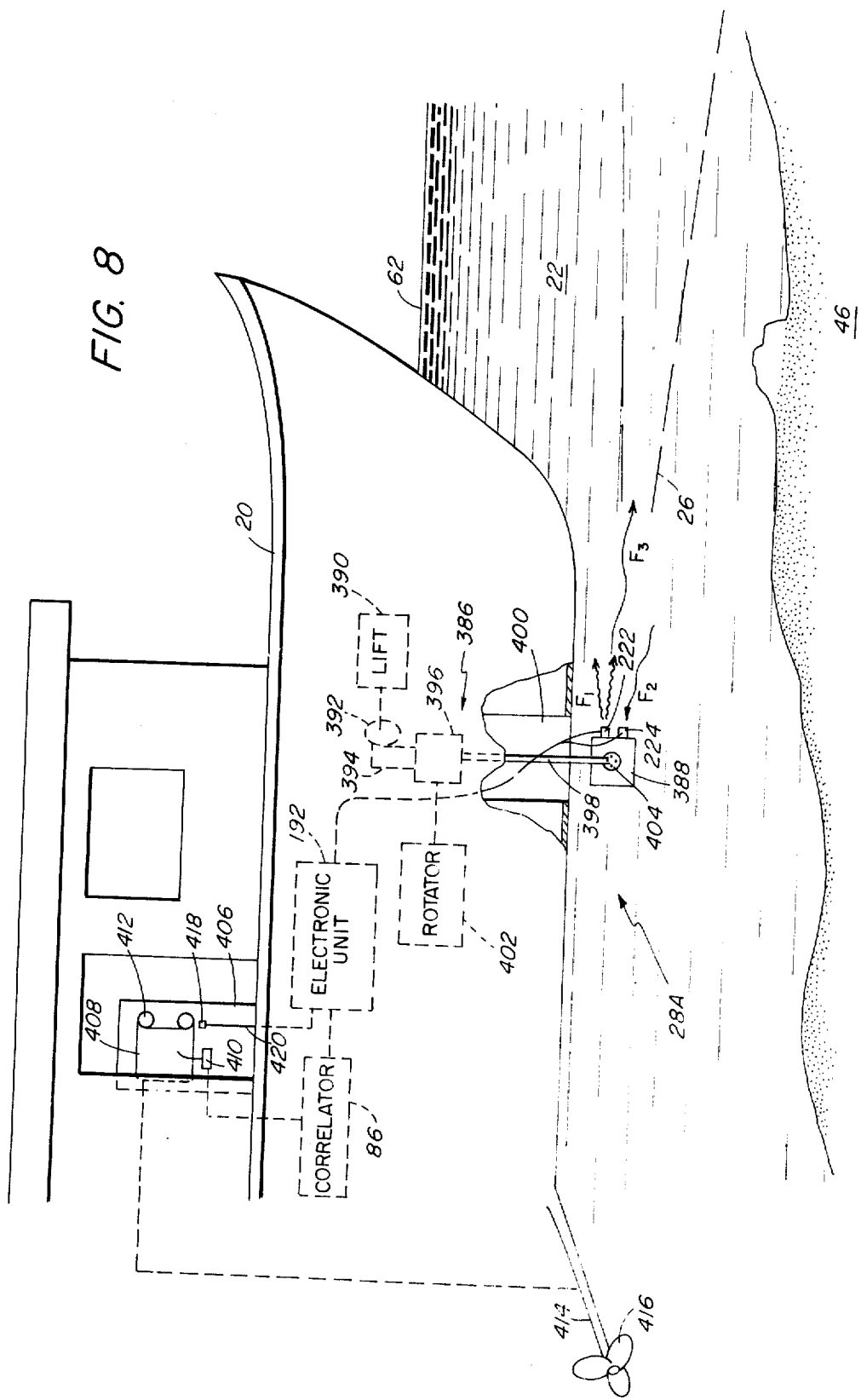

ANTI-COLLISION SONAR SYSTEM

BACKGROUND OF THE INVENTION

With the advent of large ocean-going vessels, particularly the new massive oil tankers, early warning of navigational hazards is required because of the relatively long intervals of time which are required either to slow down or to change course. Such navigational hazards include submerged wrecks and shoals, both of which may be observed with the aid of sonar.

A problem arises in that identification of submerged objects for ascertaining the degree of hazard necessitates the use of high resolution sonar. High resolution has been obtained typically with the aid of high frequency sonars having complex directivity or radiation patterns which provide for a multiplicity of sidelobes of radiation in addition to the main lobe of radiation. Such sonars lose their effectiveness in shallow waters wherein the side lobes may contact the upper and lower surfaces of a body of water causing reverberations from the waves on the upper surface and sea-bottom irregularities on the lower surface. Such reverberations are known to mask the signals obtained from reflecting objects thereby reducing the chances of successful identification of the objects. Also, high frequency sonars are severely limited in range, as compared to low frequency sonars, due to the greater attenuation of the high frequency sonic radiation.

A further problem arises in certain situations wherein a smooth ocean bottom has a very gradual slope which provides virtually no reflections of sonar energy incident thereupon in a substantially horizontal direction, this being the direction of incidence at long ranges ahead of a ship sailing in the ocean waters. While prior art depth sounding techniques can provide the present value of depth, the large ships require much forewarning of navigational hazards and, accordingly, are not provided with an indication of the sea-bottom conditions in adequate time to slow down or to alter course.

Still another problem arises in that reflections from submerged objects frequently do not provide sufficient data to enable identification until the submerged object has been observed for a relatively long period of time during which time the ship may well have moved a considerable distance relative to the submerged object. In view of the apparent shifting of position between the submerged object and the moving ship, a problem exists in that data obtained at specific ranges from the ship may no longer coincide with the data previously obtained from the reflecting object under observation.

SUMMARY OF THE INVENTION

The foregoing problems and other advantages are provided by a system in accordance with the invention which provides for the radiation of acoustic energy between two interfaces of an acoustic medium while minimizing reverberations from these two interfaces by providing a radiation pattern having substantially no side lobe radiation. In the typical situation wherein one of the interfaces is the wave surface of the ocean between the water and the air and the second interface is at the ocean bottom, the invention provides for a supporting structure for the projector of a forward looking sonar which can raise or lower the projector to a desired depth and is also adapted for tilting the projector in elevation as well as providing for a rotation of the projector in azimuth. A further embodiment of the invention incorporates a second sonar system which directs acoustic radiation in a generally downward direction for obtaining successive measurements of the ocean depths and for measuring ship speed via a doppler frequency shift imparted to radiation reflected from the ocean bottom or from a boundary between layers of water of differing temperatures. A data storage and display system is coupled to the forward looking sonar and the second sonar system for storing and displaying data obtained from the forward looking sonar while the ship speed data is utilized in the data storage system for coordinating received data with the relative motion between the ship and reflecting objects in the ocean. A stranding range predictor is also disclosed which stores successive depth measurements obtained by the second sonar system and utilizes the successive measurements to compute successive values of a stranding range such as might occur in the situation where a submerged sandbar has a gently sloping surface.

BRIEF DESCRIPTION OF THE DRAWINGS

The aforegoing features and other aspects of the invention are explained in the following description taken in connection with the accompanying drawings wherein:

FIG. 3 is a block diagram of the depth sounder and doppler sonar system of FIG. 2;

FIG. 5 is a block diagram of a forward looking sonar of FIG. 2;

FIG. 7A is a timing diagram useful in explaining FIG. 7; and

FIG. 8 is a diagrammatic view of a mechanical system for positioning the transducers of the forward looking sonar to adjust the position of the beam of sonic energy to minimize reverberations from the upper and lower surfaces of the body of water in which the ship is navigating.

DESCRIPTION OF THE PREFERRED EMBODIMENT

Figure 1:
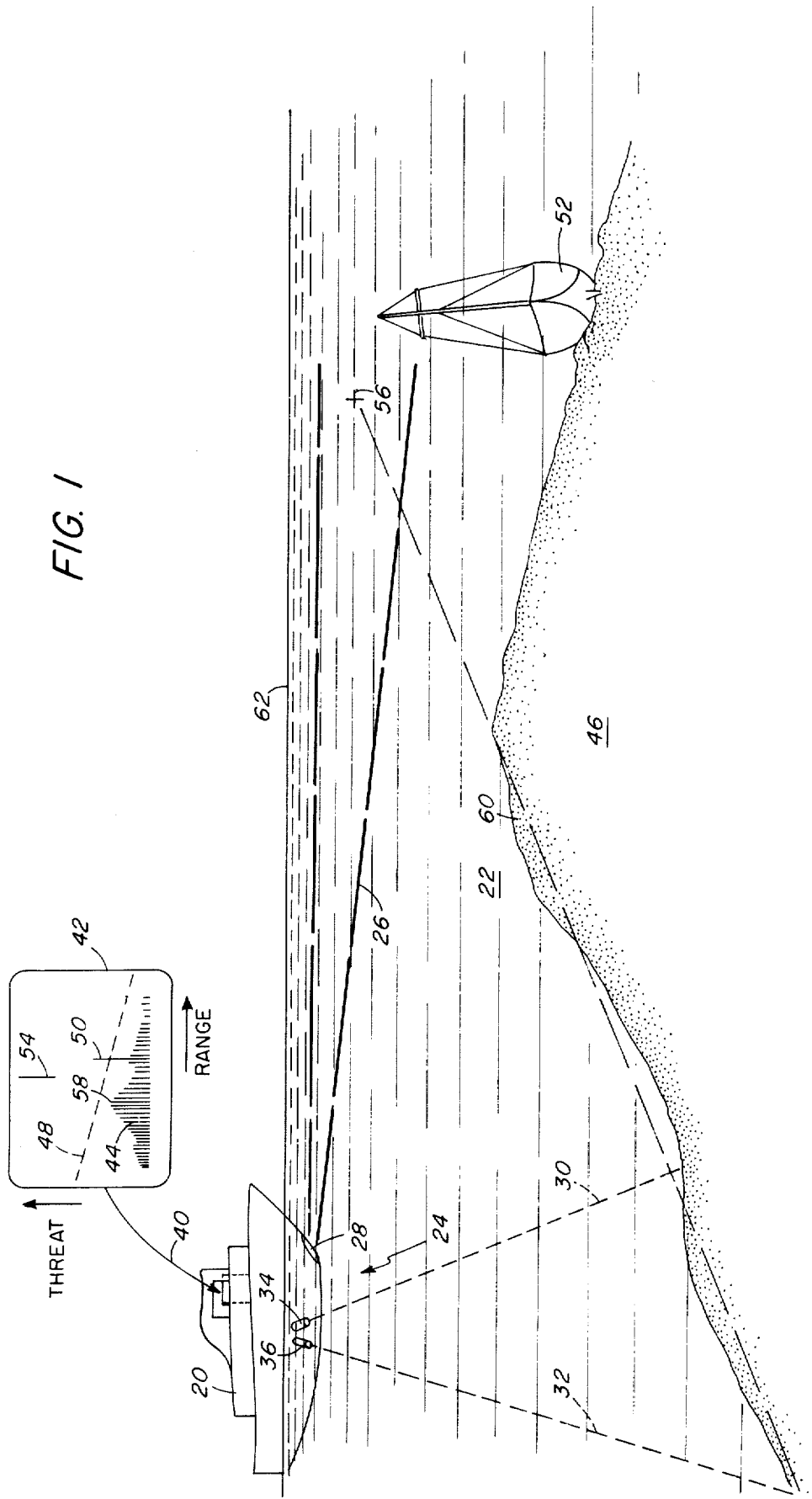
FIG. 1 is a stylized view of a ship carrying a plurality of sonar systems in accordance with the invention while navigating through a body of water.
Figure 2:
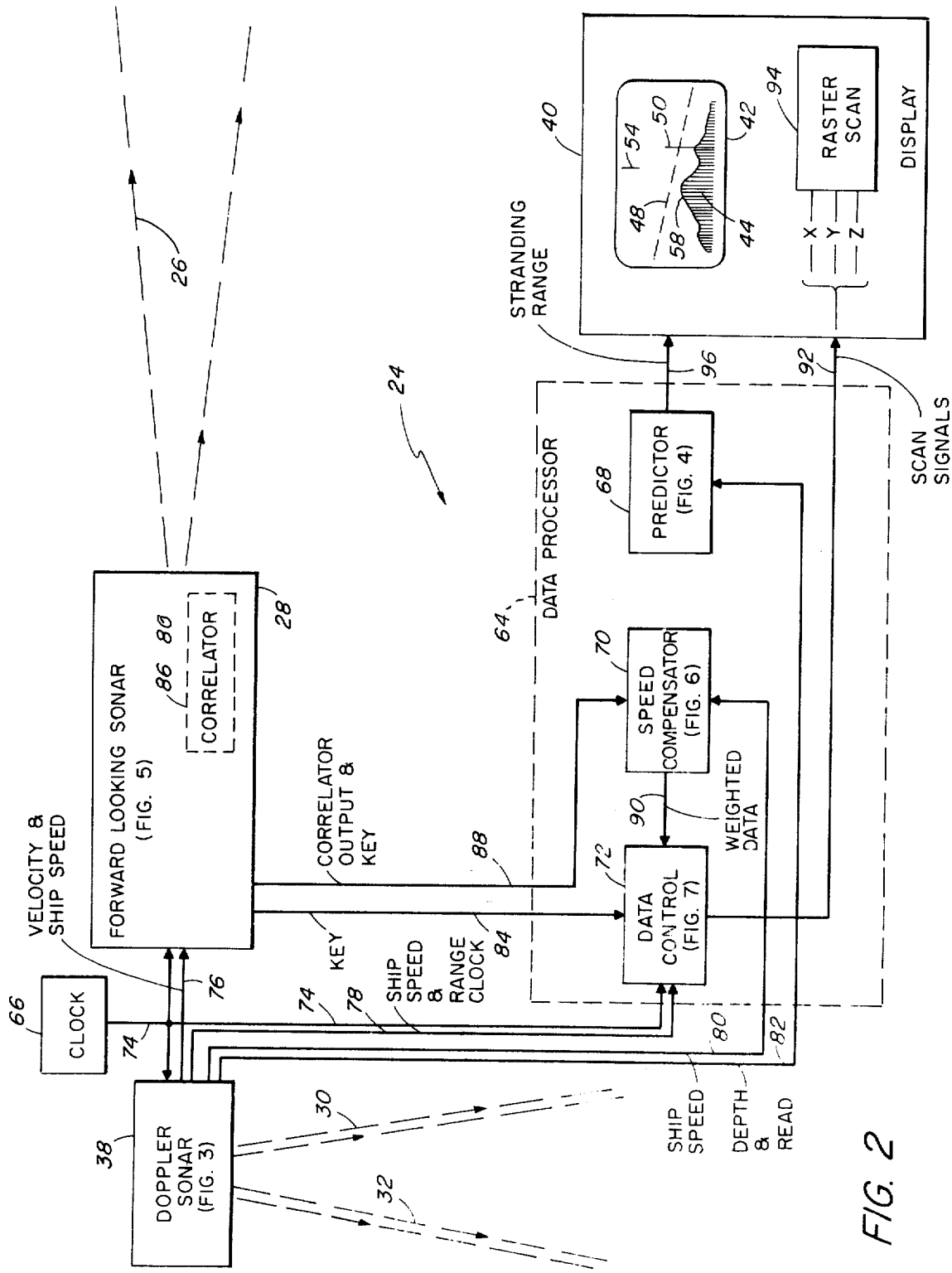
FIG. 2 is a block diagram showing a plurality of sonar systems coupled to a data processor and a display in accordance with the invention.

Referring now to FIG. 1, there is seen a stylized pictorial view of a ship 20 navigating through the ocean 22 with a sonar system 24 according to the invention being carried within the ship 20 and seen in greater detail in FIG. 2. The ship 20 with its sonar system 24 is seen transmitting a beam 26 from a forward looking sonar 28 directed ahead of the ship 20 and two beams 30 and 32 of sonic energy directed in a generally downward direction from a pair of transducers 34 and 36 mounted in the hull of the ship 20 which are a part of a doppler sonar 38 seen in FIGS. 2 and 3. The sonar system 24 also comprises a display 40 seen in the bridge of the ship 20 and also seen in FIG. 2. An enlarged view of the face 42 of the display 40 is also presented in FIG. 1 and shows a record 44 of accumulated echoes received along the beam 26 as a function of the positions of their respective sources of reflection along the bottom 46 of the ocean 22. The face 42 also shows a threat line 48 useful in evaluating the magnitude of a navigational hazard represented by each portion of the record 44 such as, for example, the portion of the record 44 represented by the bar 50 which indicates that a sufficient number of echoes have been received from a specific source of reflection on the ocean bottom 46 to represent a possible threat to navigation, the threat and the source of reflection, in this example, being a sunken wreck 52. Also seen on the face 42 is a marker 54 representing the location of a predicted stranding range, the prediction being based, in a manner to be described, on depth signals communicated along the beams 30 and 32 from successive positions along the bottom 46; the stranding range corresponding to the position of the marker 54 is indicated by an X labeled 56 on the drawing. The region of vertical bars of the record 44 having the shape of a mound 58 represents the shoal 60 which, as can be seen from the drawing, does not rise up high enough to present a threat of stranding, and as seen on the face 42 of the display 40, the mount 58 is below the threat line 48. The data representing the shoal 60 was obtained earlier when the ship 20 was at a long distance therefrom wherein the shoal 60 was illuminated by the beam 26.

As will be described more fully with reference to FIG. 8, the forward looking sonar 28 is positioned a sufficient distance beneath the surface 62 of the ocean 22 so that the beam 26 can propagate without generating reverberations from waves at the surface 62. In order to provide for sufficient range for the forward looking sonar 28, the energy radiated in the beam 26 is preferably of a low frequency, typically in the range of 10–30 kHz (kilohertz).

As is well known in the sonar arts, the generation of a highly directive beam, on the order of 2° beam width, would require radiation from a projector that would be excessively large and heavy to permit convenient installation on board a ship. Accordingly, low frequency radiation is provided in the preferred embodiment of the invention by the use of a nonlinear interaction, often referred to as a finite amplitude effect, between two beams of radiant energy having relatively high frequencies, for example, on the order of 5–10 times the low frequency of the beam 26. A particular advantage of the utilization of the finite amplitude effect is the attaining of a long region of ensonified water ahead of the forward looking sonar 28 wherein the high frequency radiations coact to provide a highly directive pattern of low frequency radiation in which side lobes are virtually nonexistent. This has the very beneficial result, in accordance with the invention, wherein the beam 26 can be positioned with a substantially horizontal orientation with radiation being directed beneath the troughs of such waves as may appear on the surface 62 without any significant amount of energy being reflected off of these waves. In a similar manner, the radiation is free of reverberations from the opposite interface of the ocean 22 and its boundary, namely, the bottom 46, so that only protuberances from the bottom 46, such as the sunken wreck 52 or sharp inclines in the bottom 46, serve as sources of echoes from which the forward looking sonar 28 obtains ranging data.

Referring now to FIG. 2, there is seen a block diagram of the sonar system 24 describing the interconnection of the forward looking sonar 28, the doppler sonar 38, the display 40, a data processor 64, and a clock 66 which serves as a common source of timing signals for coordinating their operations. The data processor 64 is seen to comprise a predictor 68, a speed compensator 70 and a data controller 72. Clock signals are provided on line 74 to the doppler sonar 38, the forward looking sonar 28 and the data processor 64. Velocity and ship speed data are provided by the doppler sonar 38 along cable 76 to the forward looking sonar 28. Ship speed and range clock signals are provided by the doppler sonar 38 along the cable 78 to the data controller 72. Ship speed data is provided by the doppler sonar 38 along line 80 to the speed compensator 70. Depth and read signals are provided by the doppler sonar 38 along line 82 to the predictor 68. The forward looking sonar 28 provides a key signal on line 84 to the data controller 72 and the key signal and an output signal of a correlator 86 of the forward looking sonar 28 along line 88 to the speed compensator 70. The speed compensator 70 provides weighted data on line 90 to the data controller 72. The data controller 72 provides X, Y and Z drive signals along cable 92 to raster scan circuitry 94 which develops, in a well-known manner, the graphical display presented on the face 42 of the display 40. The marker 54 on the display 40 is presented in response to the stranding range data presented by the predictor 68 on line 96. The forward looking sonar 28 is seen to be providing its beam 26 and the doppler sonar 38 is seen to be providing its pair of beams 30 and 32.

The system of FIG. 2 acts, in accordance with the invention, to coordinate data received by the forward looking sonar 28 with the position of the ship 20 of FIG. 1 relative to the positions of various sources of reflection of sonic energy, and to display the resultant data. The speed compensator 70 provides for a weighting of the data in accordance with the speed of the ship 20 so that, for example, in the event that the ship 20 is proceeding very slowly, the record 44 appearing on the face 42 of the display 40 does not assume excessively large values because of the relatively large number of echoes received during the relatively long period of time that the ship 20 occupies a particular position, and to ensure that the record 44 does not assume excessively low values during the relatively short period of time that the ship 20 occupies a particular position while sailing at high speed. The data controller 72 stores data in bins, in a manner to be described, from which data is cyclically transmitted to the display 40, and provides for a reordering of the bins in accordance with ship speed data so that the ordering of the bins corresponds to the sources of echoes on the ocean bottom 46 of FIG. 1. The predictor 68 calculates the stranding range, referred to previously in reference to the description of FIG. 1, from successive measurements of depth provided on cable 82 from the doppler sonar 38.

Referring now to FIG. 3, there is shown a block diagram of the doppler sonar 38 which comprises a timing unit 98, a generator 100, a pair of receivers 102A–B, a pair of transmit-receive circuits 104-B, the two transducers 34 and 36 previously seen in FIG. 1, a doppler combiner 106, a range combiner 108, a counter 110 and a storage unit 112. The generator 100 in response to timing signals on line 114 from the timing unit 98 provides a pulse carrier signal which is passed via the transmit-receive circuits 104A-B to the transducers 34 and 36. The transmit-receive circuits 104A-B function in a well-known manner to protect the receivers 102A-B from the relatively strong signal provided by the generator 100 while permitting signals received by the transducers 34 and 36 to be passed respectively to the receivers 102A-B. The transducer 34 transmits signals along the beam 30 which is inclined at approximately a 30° angle forward of the vertical direction while the transducer 36 transmits signals along the beam 32 which is oriented at an angle of approximately 30° aft of the vertical direction. These signals then reflect off of the ocean bottom 46 back towards the transducers 34 and 36 and acquire doppler shifts to their respective carrier frequencies due to the motion of the ship 20 of FIG. 1. Signals transmitted along the beam 30 acquire a positive doppler shift while the signals transmitted along the beam 32 acquire a negative doppler shift for a forward motion of the ship 20, both of these doppler shifts being scaled in magnitude by sine 30° due to the inclination of the beams 30 and 32. The aforementioned magnitude of the doppler shifts represents an average value since a pitching motion of the ship 20 will alter the instantaneous values of these doppler shifts. The receivers 102A-B are of a well-known form having suitable means for providing a measure of the doppler frequency which is presented respectively on lines 116A-B as well as detecting the envelope of received signal pulses which serve as range signals appearing on lines 118A-B respectively. The doppler combiner 106 substracts the doppler signal on line 116B from the doppler signal on line 116A to provide an output doppler signal representing the speed of the ship 20, this output doppler signal being stored in the storage unit 112 with the aid of the timing signal on line 114 which is applied to the clock input of the storage unit 112. For example, the output doppler signal of the doppler combiner 106 may be a digital number and the storage unit 112 may be a register for storing this digital number. The range combiner 108 may select either the range as obtained from the signal on line 118A or the range as obtained from the signal on line 118B or can combine these two signals to provide a signal on line 120 which represents the time of occurrence of the average value of these two signals. The counter 110 begins to count clock pulses on line 122 in response to the timing signal on line 114 and terminates the counting in response to the range signal on line 120.

The doppler sonar 38 further comprises rate multipliers 124 and 126, a sensor 128 of water temperature, a storage unit 130 which is of the same form as the storage unit 112, an indicator 132 and five dividers 133-137. The rate mutliplier 124 receives clock pulses on line 140 from the timing unit 98 and a digital number on line 142 representing the magnitude of the water temperature of the ocean 22. The rate multiplier 124 is a well-known device such as a commercially available unit from Texas Instruments having part No. SN7497 and provides a succession of pulses on line 144 having an average pulse repetition frequency which is proportional to the repetition frequency of the clock pulses on line 140 and is also proportional to the magnitude of the digital number on line 142. The sensor 128 is preferably mounted on the hull of the ship 20 of FIG. 1 to sense variations in the water temperature as the ship 20 progresses along the ocean surface 62. The pulses appearing on the line 144 may serve as clock pulses as do the pulses appearing on line 140 for the measurement of the round trip propagation time of signals along the beams 30 and 32 and, hence, the ranges from the transducers 34 and 36 to the points of reflection from the ocean bottom 46 of their respective signals. Due to the multiplying factors on line 142, the average repetition frequency of the pulses on line 144 varies in accordance with the water temperature and, accordingly, a range or depth measurement made with the aid of the pulses on line 144 is thereby made more accurate by virtue of the compensation for variations in the speed of sound propagation in the ocean 22 as a function of the temperature of the ocean water.

As is well known from the nature of gating and flipflop circuitry of the rate multiplier 124, there is a substantial variation in the intervals between successive ones of the pulses on line 144 while the count of a large number of these pulses over a long interval of time including many of these pulses is a very accurate measure of elapsed time. Accordingly, the divider 136 which divides by a suitable number N4 where, for example, the divider 136 may be a recirculating counter which counts modulo 512 and puts out a pulse on line 122 at each count of 512, the divider 136 then divides by a value of $N4 = 512$ which substantially smoothes out the aforementioned irregularity in the instantaneous repetition frequency of the pulses on line 144 to provide the aforementioned pulses on line 122 which are suitable for clocking the counter 110. In view of the fact that the beams 30 and 32 are oriented at an angle of 30° with respect to the vertical, the repetition frequency of pulses on line 140 as well as scaling factors introduced by the digital signal on line 142 and the divider 136 are selected to provide a count of the counter 110 which represents the depth measured between the ship 120 and the ocean bottom 46.

The depth measured by the counter 110 is passed via line 146 to be clocked into the storage unit 130 in response to the signal on line 120. Thus, the signal on line 120 serves a dual function of stopping the counter 110 and clocking the count into the storage unit 130. The digital number stored in the storage unit 130 is coupled via line 148 into the indicator 132 which indicator may comprise, for example, a digital read-out for displaying the depth. In this connection, it is noted that the lines 142, 146 and 148 are each shown in the drawing as a wide line to indicate that they represent a plurality of wires each of which transmits one digit of a multidigit number; a similar comment applies to other lines carrying digital numbers which will be portrayed as wide lines hereinafter.

The speed data stored in the storage unit 112 is applied along line 150 through the rate multiplier 126, the line 150 being labeled "raw speed" to indicate that the speed data has not yet been compensated for the water temperature of the ocean 22. The rate multiplier 126 is of the same form as the rate multiplier 124 previously described. Also, the operation of the divider 133 is similar to that of the divider 136, previously described. Accordingly, the succession of pulses appearing on the line 122 is converted by the rate multiplier 126 to a succession of pulses on line 152 having an average repetition frequency proportional to the raw speed on line 150, however, since the repetition frequency of pulse on the line 122 is compensated for the water temperature, so too, the average repetition frequencies of the pulses on the lines 152 and 154 are compensated for water temperature. The divider 133 functions in a manner similar to that of the divider 136 and divides by N1, a suitably large number such as 400, for converting the irregularly occurring pulses on line 152 into a lower frequency, more regularly occurring train of pulses on line 154.

The doppler sonar 38 further comprises a delay unit 156, a counter 158, a storage unit 160 similar to the storage unit 112, and an indicator 162 for indicating the speed of the ship 20, the indicator 162 being of a well-known form such as the indicator 132. The clock pulse provided by the timing unit 98 on line 164 is applied to the clock input of the storage unit 160 for clocking in a digital number from the counter 158, and is also delayed by the delay unit 156 and then applied via line 166 to reset the counter 158 at a time subsequent to the clocking of the storage unit 160. Upon being reset by the signal on line 166, the counter 158 begins to count the pulses arriving on line 154 and continues to count these pulses until the counter 158 is again reset whereupon the cycle repeats. The clock pulses on line 164 are presented at regular intervals so that the counter 158 counts over regular intervals of time and accordingly accumulates a count equal to the number of pulses appearing on the line 154 during each of those intervals of time. Since the pulses on line 154 are presented at a repetition frequency proportional to the received doppler and proportional to the water temperature, the count provided by the counter 158 represents the ship speed compensated for water temperature. The value of the ship's speed stored in the counter 160 is presented on the indicator 162 and is also transmitted via line 168 in cable 76 to the forward looking sonar 28.

Since the pulses appearing on line 154 occur at a rate proportional to the speed of the ship 20, it is apparent that an integration or accumulation of the pulses on line 154 will present a quantity proportional to the distance traveled by the ship 20. Accordingly, there is provided a counter 170 having a switch 172 coupled thereto for manually resetting the counter 170 and an indicator 174 similar to the indicator 132 and coupled to the output of the counter 170 for indicating the distance traveled by the ship 20. The counter 170 is reset by the switch 172 at the beginning of each trip of the ship 20. The dividers 133, 134 and 135 as well as the divider 137 each have a form similar to that of the divider 136 and provide appropriate scaling factors. Thus, the divider 133 divides the pulse repetition frequency of the signal on line 152 to an appropriate value for operating the speed counter 158. The pulse repetition frequency of the signal on line 154 is further scaled by dividing by the factor N2 at the divider 134 to provide a pulse train signal on line 80 wherein the pulses occur at a rate which varies with the rate of the ship's speed, a pulse occurring on line 80 for each ten yard increment of distance traveled by the ship 20. The pulse repetition frequency of the signal on line 80 is further divided by the factor N3 at the divider 135, the factor N3 providing a suitable scaling of the pulse repetition frequency of the signal on line 80 such that the counter 170 provides a distance in increments of one-tenth mile. The ten yard ship's speed pulses on line 80 are also applied by a cable 76 to the forward looking sonar 28, to the speed compensator 70, along cable 82 to the predictor 68 and along cable 78 to the data controller 72. The signal on line 80 is divided by five at the divider 137 to provide 50 yard ship speed pulses on line 176 which serve as a read signal for the predictor 68 and are communicated thereto via the cable 82. The depth signal on line 148 is also communicated via cable 82 to the predictor 68. The temperature compensated clock pulse signal on line 122 is transmitted to the data controller 72 via cable 78 along with the ten yard ship's speed pulses of line 80.

As has been mentioned hereinabove, the doppler signals received along the beams 30 and 32 result from reflections from the ocean bottom 46. At depths beyond 600 feet, the receivers 102A-B are set in a well-known manner to respond to reflections from interfaces between layers of water at differing temperatures, these interfaces being sometimes referred to as thermoclines and providing a suitable source of ship's speed data in deep waters.

Figure 4:
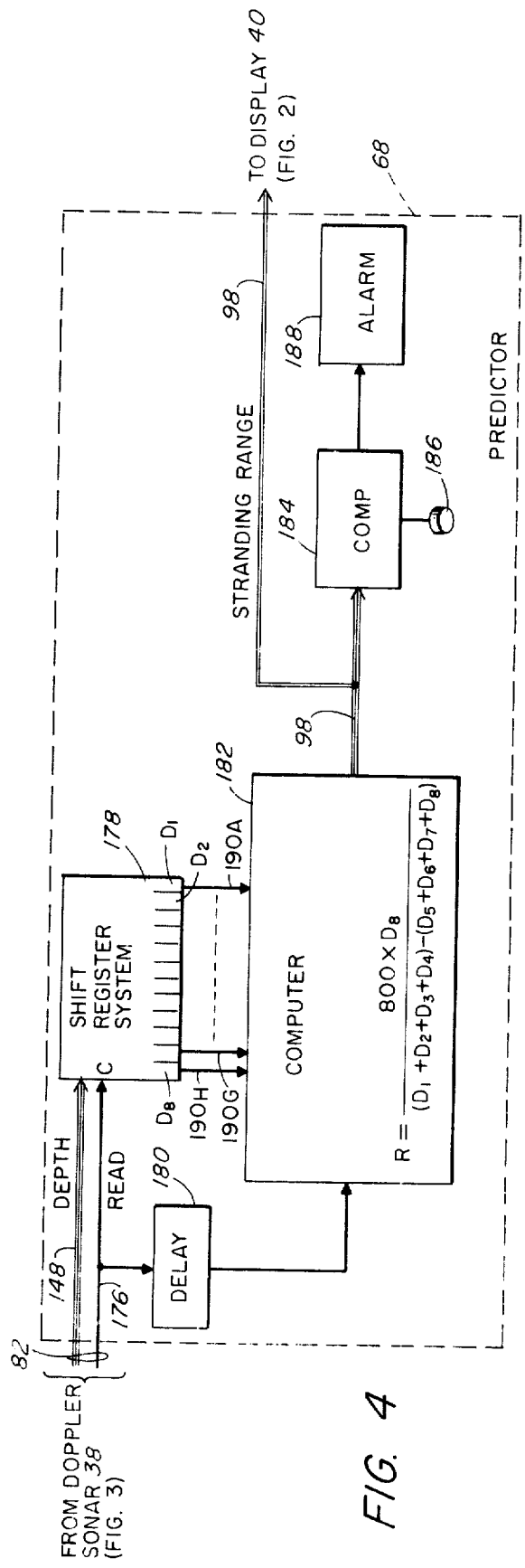
FIG. 4 is a block diagram of a predictor utilizing calculating stranding range from depth data obtained from a sonar system of FIG. 3.

Referring now to FIG. 4, there is shown a block diagram of the predictor 68 which is seen to comprise a shift register system 178, a delay unit 180, a computer 182, a comparator 184 having a knob 186 for setting a reference level of the comparator, and an alarm 188. The depth and read signals provided by the doppler sonar 38 are presented on lines 148 and 176 to the shift register system 178, the read signal being applied to the clock input terminal of the shift register system 178 for clocking or reading in successive values of the digital number representing the depth on line 148. The shift register system 178 comprises a plurality of shift registers in which the first stage of each shift register receives one digit of a digital number representing the depth while the second stage of each of the plurality of shift registers stores respective ones of the digits of the number representing another depth measurement. Upon the application of successive read signals, successive values of the depth measurement are read into the shift register system 178 while preceding values of the depth measurement are clocked through successive stages of the shift register system 178. After passing through all eight stages of the shift register system 178, a depth measurement is discarded.

The read signal on line 176 is also passed via the delay unit 180 to signal the computer 182 to perform a caculation. The delay unit 180 has sufficient delay to permit the depth measurements to be updated in the shift register system 178 prior to the initiation of the computer calculation. The computer 182 performs the calculation indicated by the mathematical expression shown on the drawing wherein R represents the stranding range and the symbols $D1, D2 \ldots D8$ represent the values of depth stored in these excessive stages of the shift register system 178 and are coupled therefrom through the computer 182 via the lines, respectively, 190A–H. As was explained with reference to FIG. 3, each read signal on line 176 occurs with an increment in ship's distance of 50 yards. Accordingly, D1 represents a first depth measurement, D2 represents the depth corresponding to the position of the ship when the ship has traveled a distance of 50 yards, D3 represents the depth at the position of the ship corresponding to a further traveling of 50 yards, this relationship being repeated for subsequent entries of depth into the shift register system 178. The output of the computer 182 is the stranding range which is provided on line 98 to the display 40 and is also applied to the comparator 184 which compares the computed stranding range to a preset number selected by the knob 186. Whenever the stranding range on line 98 falls below the preset number, the comparator 184 transmits a signal to the alarm 188 which then warns an operator of the ship 20 to change course or take other evasive action.

Referring now to FIG. 5, there is seen a block diagram of the forward looking sonar 28 which is seen to comprise an electronic unit 192 and the correlator 86. The electronic unit 192 comprises a ramp generator 194 and a pulse generator 196, both of which are triggered by the key signal on line 84, a voltage controlled oscillator to be referred to as VCO 198, two fixed frequency oscillators 200 and 202, three mixers 204, 206 and 208, three gates 210, 212 and 214, two amplifiers 216 and 218, a receiver 220, a transducer 222 which serves as a projector and a transducer array 224 comprising a pair of hydrophones. The forward looking sonar 28 transmits sonic energy at two frequencies, indicated by the symbols F1 and F2, which result in the propagation of sonic energy at the difference frequency F1-F2 because of the aforementioned finite amplitude effect. Sonic energy at the difference frequency F1-F2 is seen propagating through the ocean towards a reflecting object 226 and reflecting therefrom towards the transducer array 224. The transducer 222 is of sufficient bandwidth for transmitting energy at F1 and F2 and is of sufficiently large physical dimensions to provide a beamwidth of approximately 2° at the frequency F1 and the frequency F2. While the transducer array 224 may comprise a single hydrophone or multiplicity of hydrophones (not shown), the preferred embodiment utilizes a pair of hydrophones mounted side by side for increased directivity of the receiving beam pattern at the difference frequency F1-F2. The transducer 222 and the transducer array 224 are conveniently mounted in the forward part of the hull at the location shown for the forward looking sonar 28 in FIG. 1.

The pulse generator 196 is triggered by each occurrence of the key signal on line 84, the key signal to be described hereinafter, and in response to this triggering, transmits a gating pulse along line 228 to each of the three gates 210, 212 and 214. The oscillator 202 generates a sinusoidal signal having the frequency F1 and passes this signal through the gate 214 which gates this signal in response to successive occurrences of the gating pulses on line 228 to provide on line 230 a pulsed sinusoid having the carrier frequency F1.

In response to a triggering by the key signal on line 84, the ramp generator 194 applies a ramp voltage to the VCO 198 which, in response thereto, provides a frequency modulated sinusoidal signal on line 232 in which the instantaneous frequency varies with a ramp modulation pattern. For example, this frequency may vary from 2.5 kHz to 4.5 kHz. The signal on line 232 is then mixed with a 28.5 kHz sinusoid provided by the oscillator 200 at the mixer 204 to provide a sinusoidal signal on line 234 wherein the instantaneous frequency varies from 24 kHz to 26 kHz. The mixer 204 includes filtering which passes signals in the 24–26 kHz frequency range while excluding other frequencies resulting from the mixing operation. The gate 212 operates in a manner similar to that of the gate 214 to provide a gated frequency modulated sinusoid on line 236 which is then applied to the mixer 206 along with the gated sinusoid on line 230. The gate 212 excludes any signals that may be produced by the VCO 198 during intervals of time occurring before and after the gating interval to insure that the signal on line 236 has a desired pulse width and a desired frequency modulation from 24 kHz to 26 kHz. The mixer 206 operates in a manner similar to that of the mixer 204 and provides a pulsed sinusoid on line 238 having the frequency F2 which varies from 156 kHz to 154 kHz. These signals on the lines 230 and 238 are then summed together in the amplifier 216 and applied to the transducer 222 for radiation into the ocean 22 along the beam 26 of FIG. 1. The aforementioned finite amplitude effect provides that the beam 26 of radiation at the frequency F1-F2 has a beam width approximately equal to the widths of the main lobes of the radiation patterns produced by the transducer 222 at the frequencies F1 and F2.

Sonic energy signals at the frequency F1-F2 incident upon the transducer array 224 are converted into electrical signals and applied to the receiver 220 which filters these signals to exclude any signals at the frequencies F1, F2 or other arithmetic combinations of these frequencies falling outside the bandwidth of the pulse signal received at the frequency F1-F2. The output signal of the receiver 220 has a ramp frequency modulation from 24 kHz to 26 kHz and is amplified by the amplifier 218 and then mixed in the mixer 208 with the sinusoid at 28.5 kHz provided by the oscillator 200. The mixer 208 functions in a manner analogous to the mixer 204 and provides an output signal on line 240 which is a pulsed sinusoid having a ramp frequency modulation in which the frequency varies from 2.5 kHz to 4.5 kHz.

The correlator 86 comprises two limiters 242A-B, two samplers 244A-B, two switches 246A-B, two shift registers 248A-B, a comparator 250, a filter 252 and two timing units 254 and 256. The inputs to the correlator 86 are a reference signal on line 258 which is applied to the limiter 242A, the received signal on line 240 which is applied to the limiter 242B, a clock signal on line 74 which is applied to the timing units 254 and 256, and the velocity signal on line 168 which is applied to the timing unit 256. The reference signal on line 258 is applied in response to each occurrence of the key signal on line 84 by the gate 210 which, in response to the gating pulse provided by the pulse generator 196 on line 228, passes a pulse of the output signal of the VCO 198. Thus, it is seen that the signals on line 258 and 240 are each pulsed sinusoids wherein the frequency varies from 2.5 kHz to 4.5 kHz during the duration of the pulse. the timing unit 254 provides timing signals in synchronism with the clock signal on line 74, these timing signals being applied at terminals T1-T5 to respectively the sampler 244B, the switch 246B, the shift register 248B, the sampler 244A, and the siwtch 246A. The timing unit 256 in response to the clock signal on line 74 and the velocity signal on line 168 generates timing signals at terminal T6 for operating the shift register 248A, the timing signal at T6 differing from that at T3 in that while the two have approximately the same pulse repetition frequencies, the repetition frequency of the former is made to vary slightly in response to the speed of the ship 20 of FIG. 1 while the repetition frequency of the latter is fixed.

The limiter 242A converts the signal on line 258 from a sinusoidal to a substantially square wave signal which is then sampled by the sampler 244A at a rate at least twice the frequency of the sinusoid on line 258, the sampling frequency being greater by a factor of 5 preferably 10 or higher than the frequency of the sinusoid on line 258. The timing signal at terminal T4 serves as clock pulses for operating sampler 244A at the desired sampling frequency. The high speed samples of the reference signal on line 258 are passed from the sampler 244A via the switch 246A into the shift register 248A and are clocked through the shift register 248A until the shift register 248A is filled with these samples. The number of stages in the shift register 248A is selected to equal the number of samples to be obtained during the gating interval of the gate 210. In order to synchronize this gating interval with the number of samples to be taken, the pulse generator 196 is responsive to a timing signal provided at terminal T7 by the timing unit 254 for providing the gating pulse on line 228 with a width equal to the total number of the sampling intervals. The shift register 248A is also provided with a switch 260 to render the shift register 248A responsive either to the timing signals at terminal T4 or the timing signals at terminal T6. The switch 260 is operated in response to the timing signal at terminal T5 as is the switch 246A so that during the inital loading of the shift register 248A with the samples from the sampler 244A, the samples are clocked into the shift register 248A at the rate of the clock pulses of the timing signal at terminal T4. After the shift register 248A has been filled with the samples, both the swiches 246A ad 260 are operated by the timing signal at termainal T5, the switch 246A substituting the output of the shift register 248A on line 262 in place of the output of the sampler 224A so that the shift register 248A now becomes a recirculating register in which the stored samples are recirculated via the switch 246A through the shift register 248A. However, during this recirculation, the switch 260 substitutes the clock pulses of the timing signal at terminals T6 in place of those of the timing signal at terminal T4 so that the samples are shifted at the clocking rate provided by the sampling signal at terminal T6.

The limiter 242B, the sampler 244B, the switch 246B and the shift register 248B operate in a manner analogous to, respectively, the limiter 242A, the sampler 244A, the switch 246A, and the shift register 248A. Thus, the limiter 242B converts the received signal on line 240 from a sinusoidal signal to a substantially square wave signal which is then sampled by the sampler 244B and passed via the switch 246B into the shift register 248B. The sampler 244B provides a sample in response to each clock pulse of the timing signal at terminal T1, the sampler 244B sampling at the same rate as does the sampler 244A. The shift register 248B has one more stage (or one less stage) than does the shift register 248A with the result that, assuming the ship 20 of FIG. 1 to be stationary so that there is no doppler associated with signals received along the beam 26 of FIG. 1, the samples recirculating through the shift register 248B via line 264 and the switch 246B are seen to precess relative to the recirculation of a corresponding sample in the shift register 248A. Clock pulses of the timing signal at terminal T3 occur at a very much higher rate than do the clock pulses at terminal T1, the difference in rates being sufficiently high such that a complete recirculation of the stored signal samples can be done between successive samples of the sampler 244B. The switch 246B is operated by the timing signal at terminal T2 to remain in the recirculating position except when a new sample is to be received from the sampler 244B in which case the switch 246B is momentarily switched to the alternate position to admit the sample from the sampler 244B. During the admission of the sample from the sampler 244B the earliest sample stored within the shift register 248B is discarded and replaced with the new sample.

The use of the limiter 242B and the high frequency sampling by sampler 244B renders the correlator 86 primarily responsive to zero-crossings of the received sinusoidal signal on line 240 rather than to the amplitude of the signal on line 240. In this way, the received signal is normalized so that the forward looking sonar 28 can respond to a received signal having a large dynamic range without the use of automatic gain control circuitry to substantially equalize the amplitudes of received signals having small and large amplitudes.

The output signals of the two shift registers 248A-B respectively on the lines 262 and 264 are compared by the comparator 250 which provides a logic 1 signal on line 266 whenever there is a coincidence of samples on the lines 262 and 264, the comparator 250 providing a logic 0 signal on line 266 when a sample value of 0 appears on one of the lines 262 and 264 and a sample value of 1 appears on the other of the two lines 262 and 264. The values of these samples depend on whether the sampler 244A or the sampler 244B is sampling a peak or valley of the square wave signal provided by respectively the limiters 242A-B. In the event that the ship 20 of FIG. 1 is moving, then the received signal on line 240 experiences a doppler frequency shift which causes an expansion or contraction (depending on whether the ship 20 is moving backwards or forwards) of each cycle of the signal on line 240. This variation in the individual cycles as well as the overall modulation of the signal on line 240 is also experienced in the sample signal on line 264. The aforementioned variation in the repetition frequency of the clock pulses of the timing signal at terminal T6 speeds up or retards the recirculation rate through the shift register 248A to compensate for any contraction or expansion of the modulation pattern appearing on the line 264 so that the comparator 250 can make comparisons substantially independent of doppler shifts. The signals on line 266 are then effectively integrated or smoothed by the filter 252, the filter 252 having a passband below the sampling frequency of the samplers 244A-B. The smoothed output of the bandpass filter 252 appears on line 268 and provides the usual correlation-type waveform at the instant of time when the echo or reflection from the reflecting object 266 is received at the forward looking sonar 28.

Alternatively, if desired, the timing signal at the terminal T3 may be connected to the switch 260 in lieu of the timing signal provided by the terminal T6 and the timing unit 256 may be deleted in which case the aforementioned doppler compensation is absent. Under such conditions the correlator 86 functions adequately well for relatively slow speeds of the ship 20. However, in the absence of this doppler compensation the magnitude of the signal on line 268 is reduced, this reduction in signal strength increasing with increasing speeds of the ship 20. At the slow speeds associated with navigation in harbors or other regions of shallow water, the doppler compensation would not be required, except possibly at long ranges where the signal received at the receiver 220 may be very weak. The output of the correlator 86 on line 268 is applied via cable 88 to the speed compensator 70.

The key signal on line 84 is provided by means of an AND gate 270 and a timer 272 in response to the ship's speed signal on line 80 and the clock signal on line 74. The timer 272 counts successive clock pulses appearing on the line 74 and provides a logic 1 signal at its Q output on line 274 at the conclusion of a three second interval of time. Thereafter, the Q output of the timer 272 remains unchanged until the timer is reset at its terminal R by a logic 1 signal on line 84, this being the key signal. The AND gate 270 provides the key signal in response to the presence of a ten yard ship's speed pulse on line 80 (having a logic state of 1) and the logic 1 signal on line 274. Immediately after the AND gate 270 produces the key signal, the timer 272 is reset and begins counting another three second interval. It is thus seen that the key signal cannot occur at a greater frequency than once every three seconds, and furthermore, the key signal cannot occur until the ship 20 has advanced at least ten yards from the position it occupied at the time of the previous key signal. When the ship 20 is stationary, a pulse can be applied manually on line 80 by means of the switch 276. The use of the switch 276 permits operation of the forward looking sonar 28 when the ship 20 is motionless and also in the event that the forward looking sonar 28 is to be utilized without the doppler sonar 38. The forward looking sonar 28 can also be utilized with a standard graphical recorder, as will be described hereinafter with reference to FIG. 8, rather than the display 40 of FIG. 2, in which case the key signal on line 84 is provided in a wellknown manner by a switch on the graphical recorder rather than by means of the AND gate 270 and the timer 272.

The output of the correlator 86 on line 268 and the key signal on line 84 are transmitted via cable 88 to the speed compensator 70, the key signal also being transmitted along line 84 to the data controller 72 as was disclosed previously with reference to FIG. 2. It is also noted that with respect to the timer 272, or with respect to the generation of the key signal by a graphical recorder as will be disclosed hereinafter with reference to FIG. 8, the minimum interval of three seconds corresponds to a round trip time of propagation of sonic energy between the forward looking sonar 28 and the reflecting object 226 at a range of 2,500 yards to the reflecting object 226. In the event that the forward looking sonar 28 is to be utilized for longer ranges, for example, 5,000 yards to the reflecting object 226, then the key signal would be generated at a lower repetition frequency, in this example, once every 6 seconds rather than the previously disclosed three second interval.

Figure 6:
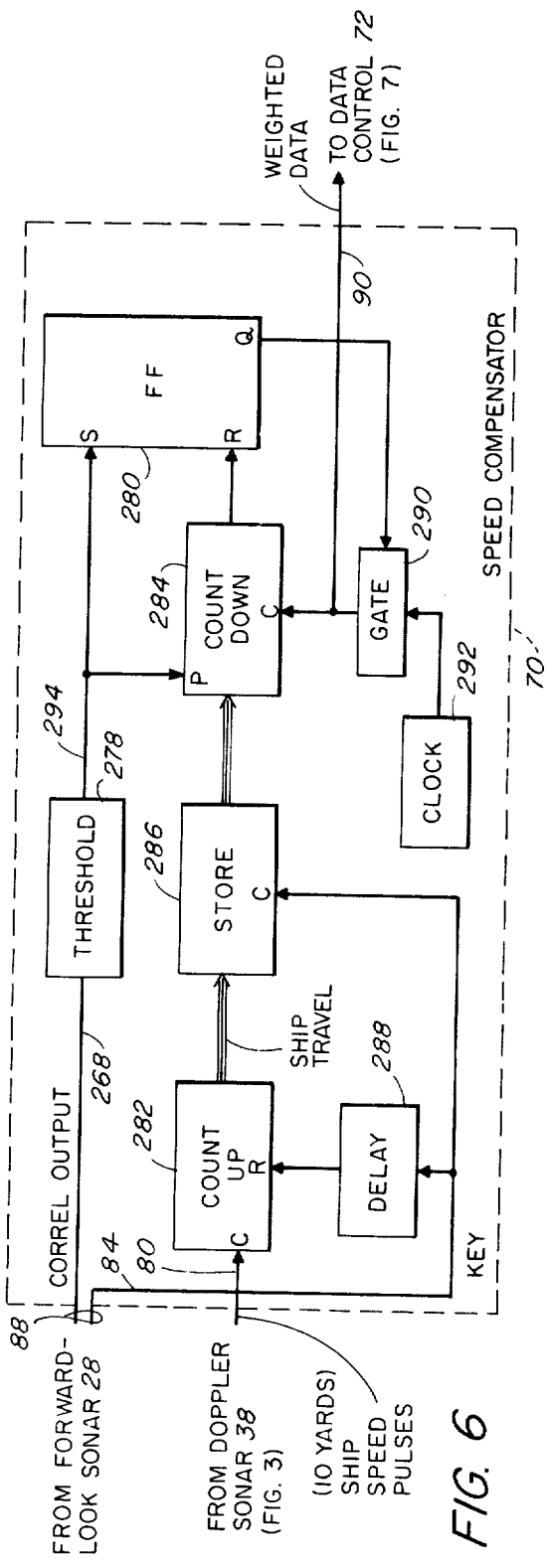
FIG. 6 is a block diagram of a speed compensator of FIG. 2 which utilizes speed data obtained from the doppler sonar of FIG. 3 for weighting the data obtained from the forward looking sonar of FIG. 5 in accordance with the speed of the ship of FIG. 1.

Referring now to FIG. 6, there is shown a block diagram of the speed compensator 70. As was seen earlier with reference to FIG. 2, the speed compensator 70 receives signals from the forward looking sonar 28 on cable 88, these signals being the correlator output on line 268 and the key signal on line 84. The speed compensator 70 also receives the ship's speed signal on line 80 from the doppler sonar 38, this signal being a sequence of pulses, one of which occurs for each 10 yards of ship's travel. Weighted data is provided by the speed compensator 70 along line 90 to the data controller 72.

The weighted data on line 90 consists of a short sequence of pulses, each of these sequences being produced in response to a pulse appearing on line 268 from the correlator 86 of FIG. 5. Recalling that the forward looking sonar 28 transmits at intervals which are three seconds duration or longer, it is apparent that when the ship 20 of FIG. 1 is traveling at a relatively high speed, the ship 20 travels a relatively long distance between successive transmissions of the forward looking sonar, but when the ship 20 is sailing at a relatively slow speed, that the ship 20 travels a relatively short distance between successive transmissions of sonic energy from the low frequency sonar 28. For example, if the ship 20 is sailing at a speed of 6 knots, then it travels a distance of approximately 10 yards in three seconds. At a speed of approximately 30 knots, the ship 20 travels 50 yards in the three second interval between transmission of the forward looking sonar 28.

With respect to the displaying of data in range bins from particular regions along the ocean bottom 46 by means of the vertical bar graph on the face 42 of the display 40 (seen in FIGS. 1 and 2), it is readily apparent that if the ship 20 travels only ten yards between successive transmissions of the forward looking sonar 28 as compared to 50 yards of travel between these transmissions at a higher rate of ship's speed, then five times as many signals will appear on the line 268 from the correlator 86 for each of these range bins for the slow ship's speed as compared to the fast ship's speed.

The function of the speed compensator 70 is to increase the ratio of the number of pulses on line 90 to the number of pulses on line 268 at high ship's speed as compared to low ship's speed so that substantially the same number of pulses will be transmitted along line 90 per range bin at high and low values of ship's speed. Accordingly, when the ship 20 travels only ten yards in each three second interval, one pulse is provided on line 90 for a single pulse on line 268. When the ship 20 travels 20 yards during each three second interval, then the speed compensator 70 provides two pulses on line 90 for a single pulse on line 268, and similarly for other values of ship's speed such that for an elapsed distance of 50 yards in each three second interval, the speed compensator 70 provides five pulses on line 90 for a single pulse on line 268.

The speed compensator 70 comprises a threshold detector 278, a flip-flop 280, two counters 282 and 284, a storage unit 286, a delay unit 288, a gate 290 and a clock 292. The clock 292 provides the aforementioned pulses on line 90 via the gate 290, the gate 290 being operated by the counter 284 and the flip-flop 280 to provide a gate width suitable for passing the required number of pulses from the clock 292 to line 90. The threshold detector 278 provides a threshold which is utilized for discriminating between low level signals and relatively strong signals on line 268, the latter presumed to represent reflections from submerged objects in the ocean 22 while the former is presumed to represent noise. In response to such ones of those signals on line 268 having an amplitude which exceeds the threshold, the threshold detector 278 provides a pulse on line 294 which sets the flip-flop 280 which, in turn, provides a logic 1 signal at its Q terminal for opening the gate 290 to allow the pulses to flow from the clock 292 to line 90.

The ship's speed data is utilized in the following manner to determine the number of pulses to appear on line 90 for each echo signal on line 268. The counter 282 counts successive ones of the pulses arriving on line 80, each of these pulses representing a 10 yard increment in the position of the ship 20 of FIG. 1. The output of the counter 282 is clocked into the storage unit 286 by the next occurrence of the key signal on line 84, the key signal also resetting the counter 282 via the delay unit 288. The delay of the delay unit 288 is sufficient to permit the count of the counter 282 to be entered into the storage unit 286 prior to the resetting of the count 282. Thereafter, the counter 282 continues to count successive occurrences of the pulses on line 80. In this way, the storage unit 286 stores the number of ten yard increments in the ship's travel accumulated between successive occurrences of the key signal. The number stored in the storage unit 286 is therefore a measure of the ship's speed or distance traveled per unit interval of time.

The counter 284 counts down from a number to which it has been preset until it reaches a count of zero at which time it applies a pulse to the reset terminal of the flip-flop 280, thereby resetting the flip-flop which, in turn, provides a logic zero signal at its Q terminal for closing the gate 290 and terminating the occurrence of further pulses on line 90. The counter 284 is preset by the pulse signal on line 294 to the number which is stored in the storage unit 286. The counter 284 counts the pulses appearing on line 90 with the result that the number of pulses appearing in each sequence (or burst of) pulses on line 90 is equal to the number of ten yard increments in the ship's travel accumulated between successive occurrences of the key signal on line 84.

Figure 7:
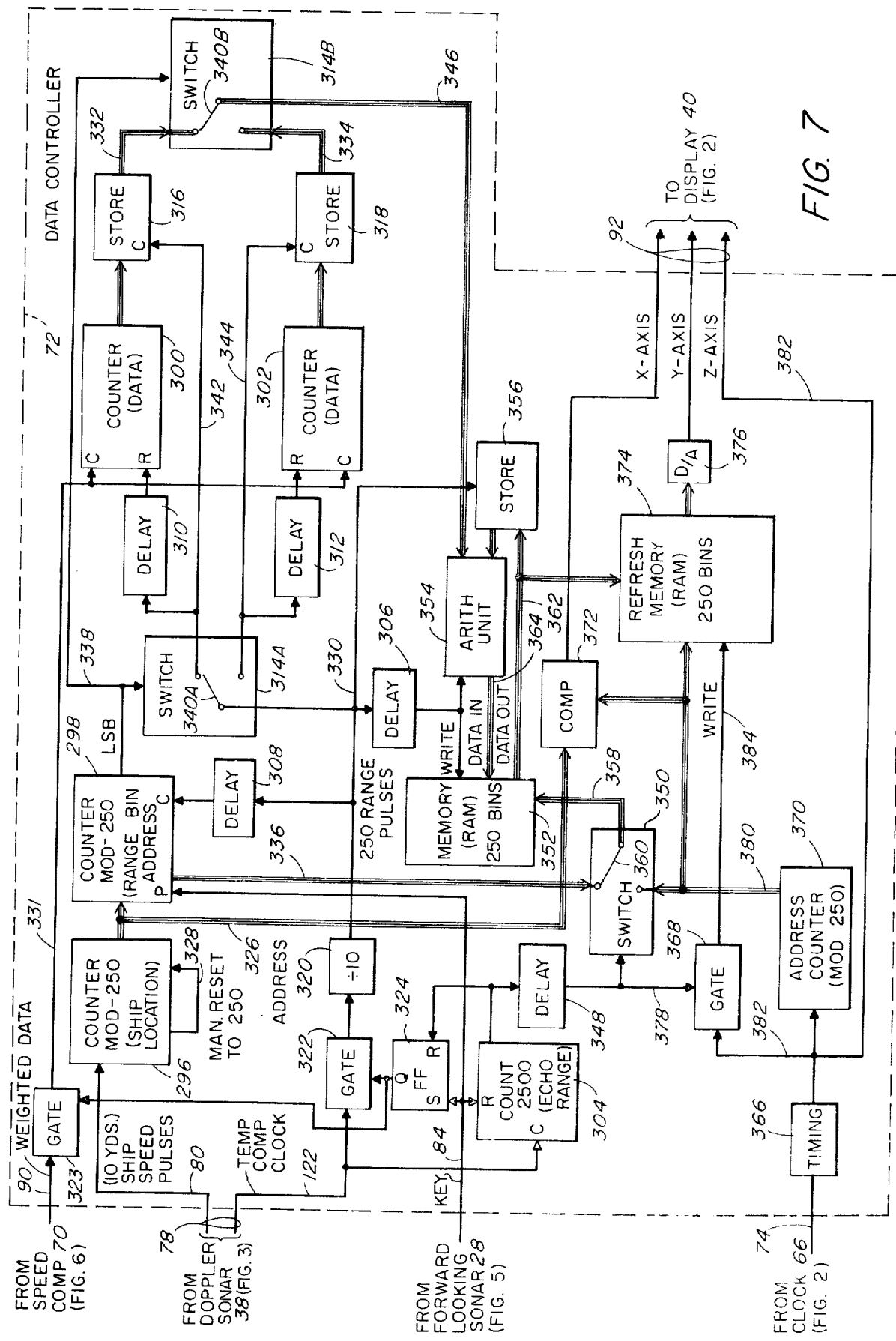
FIG. 7 is a block diagram of a data controller of FIG. 2 which stores and coordinates the data obtained from the forward looking sonar with position of the ship, and provides this data to a display of FIG. 2.

Referring now to FIGS. 7 and 7A, there are seen respectively a block diagram and a timing diagram of the data controller 72. As has been described earlier with reference to FIG. 2, the data controller 72 presents the data to the display 40 to form a bar graph display which appears as the record 44 on the face 42 of the display 40. Each vertical bar of the record 44 represents the total number of echoes as weighted by the speed compensator 70 which have been accumulated from a source of reflection of sonic energy at a specific point on the ocean bottom 46, each of these locations being referred to hereinafter as range bins. Assuming, by way of example, that the total range to be examined by the forward looking sonar 28 of FIG. 1 is 2,500 yards and that there are 250 range bins provided by the data controller 72, it is apparent that successive range bins are spaced at ten yard intervals. It has been found desirable to provide each range bin with a width of 20 yards to permit an overlapping of contiguous range bins thereby insuring that there is no lost data at a boundary line between two contiguous range bins. Thus, for example, one range bin may extend from a range of 50 yards to a range of 70 yards, the next range bin extends from 60 yards to 80 yards and the following range bin extends from 70 yards to 90 yards so that each range bin overlaps one-half of a contiguous range bin.

A feature of the invention is the displaying of the record 44 independently of the motion of the ship 20 of FIG. 1 to provide a space stablized display of the record 44 in which each vertical bar of the record 44 represents the data at a specific point of the ocean bottom 46 independently of the distance traveled by the ship 20 during the gathering of the data. The display 40 is typically a CRT (cathode ray tube) type display which necessitates a continually rapid rewriting of the displayed material to present a viewer with a substantially flicker-free presentation of the record 44. Accordingly, the data controller 72 stores the data to permit a refreshing or rewriting of the record 44 at a rapid rate (for example 20 to 40 frames per second) and also provides for the gathering of data for two range bins simultaneously due to the overlapping of the range bins. In the event that the range bins were 30 yards wide to provide still further overlapping, then the data controller 72 would have the task of coordinating the data entry into three range bins at a time, however, the overlapping feature of the invention is readily demonstrated for the situation in which only two range bins need be updated at a time. The data controller 72 also provides the function of adding new data to the previously stored data in each of the various range bins so that each bar of the record 44 represents the total data accumulated from the time when its corresponding point on the ocean bottom 46 first entered the region of coverage of the forward looking sonar 28.

The first portion of the data controller 72 to be described is that relating to the gathering of data for the various range bins. FIG. 7 shows the interconnections with the other portions of the system of FIG. 2, these interconnections being the weighted data on line 90 from the speed compensator 70, the ship's speed pulses on line 80 and the temperature compensated clock pulses on line 122 from the doppler sonar 38 along cable 78, the key signal on line 84 from the forward looking sonar 28 and the clock signals on line 74 from the clock 66. The data controller 72 comprises counters 296, 298, 300, 302 and 304, delay units 306, 308, 310 and 312, switches 314A-B, storage units 316 and 318, a divider 320, gates 322 and 323, and a flip-flop 324.

The counter 296 counts the pulses presented on line 80 and produces a digital number on the line 326 which represents the number of 10 yard increments in ship's distance accumulated by the ship 20 as it sails along the ocean 22 of FIG. 1. The counter 296 counts modulo-250 since there are 250 range bins to be accounted for, and when the ship 20 has advanced a sufficient distance, 2,500 yards, the counter 296 begins to recycle through its count. A manual reset 328 may be provided for resetting the counter 296 to a count of 250 at the beginning of a trip of the ship 20 so that after the ship has advanced a distance of ten yards, a count of 1 appears on the line 326. If the manual reset 328 is not utilized, then whatever number initially appears in the counter 296 represents the first bin. It is thus seen that the digital number appearing on the line 326 represents the most recent ship's location modulo-250.

The temperature compensated clock pulses on line 122 readily serve as ranging signals to indicate the distance traveled by sonic energy in the beam 26 of FIG. 1 since the repetition frequency of these clock pulses varies in accordance with the temperature of the water of the ocean 22 as was described hereinbefore with reference to FIG. 3. Each of the pulses on line 122 represents a round trip range of sonic energy of one yard and will be utilized in a manner to be described for designating the beginning and ending of each of the 250 range bins.

The key signal on line 84 is utilized for setting the flip-flop 324 to provide a logic 1 signal at its Q terminal for opening the gates 322 and 323, the opening of gate 322 allowing the passage of the clock pulses from line 122 through the divider 320. The key signal 84 is also utilized for resetting the counter 304 which then proceeds to count the clock pulses on line 122 until a count of 2,500 is attained whereupon the counter 304 resets the flip-flop 324 which in turn closes the gates 322 and 323, the closing of gate 322 terminating the flow of the clock pulses to the divider 320. The count of 2,500 attained by the counter 304 represents the maximum echo range to be examined by the forward looking sonar 28 of FIG. 1. The divider 320 divides by 10 to provide on line 330 a succession of range pulses each of which represents a ten yard increment in range between successive points of reflection within the ocean 22, each of these range pulses representing the termination of individual ones of the range bins. Thus, it is seen that with the appearance of the key signal on line 84, a succession of range pulses appears on line 330, this succession being terminated with the 250th range pulse in response to the resetting of the flip-flop 324 by the counter 304 as it counts out the maximum echo range to be processed. Also, since the two gates 322 and 323 are operated together via the key signal and the flip-flop 324, the gate 323 permits the passage of weighted data from line 90 to line 331 during the interval between the setting and resetting of the flip-flop 324.

As was mentioned hereinabove, the width of the range bins has been selected to provide for an overlapping of these range bins and, accordingly, the data controller 72 accumulates data for two range bins simultaneously. The counter 300 and the storage unit 316 accumulate data for one range bin while the counter 302 and the storage unit 318 accumulate data for the other range bin. Both the counters 300 and 302 count the individual pulses in each burst of pulses of the weighted data on line 331, each of the counters 300 and 302 being reset for the beginnings of their respective range bins in a manner to be described, and the storage units 316 and 318 each receive their respective read commands prior to the resetting of their respective counters 300 and 302 in a manner to be described. Thus, the storage units 316 and 318 present digital numbers on the lines 332 and 334 representing the total amount of weighted data accumulated in their respective range bins.

Each of the range pulses on line 330 are passed via the delay unit 308 to the counter 298 which counts these pulses and provides an output on line 336 which represents the most recent range bin for which data is available from one of the storage units 316 and 318. Immediately preceding the transmission of each pulse of sonic energy along beam 26 of FIG. 1, the key signal on line 84 presets the counter 298 to the value of the number appearing on line 326. In this way, the counter 298 begins to count with the number representing the present location of the ship 20 of FIG. 1. The LSB (least significant bit) of the number on line 336 is also presented on line 338 which couples this logic signal to the switches 314A-B such that when a logic 1 signal is present on line 338, the contactors 340A-B are in the upward position as shown in the drawing while, when a logic zero signal is present on the line 338, the contactors 340A-B are in the alternate position. Each range pulse on line 330 is applied via switch 314A either to line 342 or 344 for clocking the data of either the counter 300 or 302 into the respective storage units 316 or 318. The signals on line 342 and 344 are also applied via the delay units 310 and 312 to reset the counters 300 or 302 immediately after the storage of the respective counts in the storage unit 316 or 318. The range pulses on line 330 are also applied via the delay 306 to trigger an arithmetic operation, as will be described hereinafter, immediately after the data has become available in either the storage unit 316 or 318.

In operation, therefore, the counter 298 provides on line 336 the number designating the instant range bin for which data is to be made available. This data is made available in response to a range pulse on line 330 which clocks in data to the storage unit 316 or 318 with such data being made available by the switch 314B on line 346. Immediately thereafter, either the counter 300 or 302 is reset via the passage of the range pulse through the delay unit 310 or 312. This is seen on FIG. 7A at the two upper lines wherein arrows are utilized to represent the beginning and end of the counting intervals of data by the counters 300 and 302. The range pulses on line 330 and key signals on line 84 are shown in the bottom two rows of FIG. 7A. The timing diagram of FIG. 7A shows that a resetting of the counter 300 or the counter 302 occurs a short time after the occurrence of the corresponding range pulse, this delay being provided by the delay units 310 or 312. The arithmetic command signal on line 5 of the timing diagram represents the delaying of the range pulse by the delay unit 306 to permit an arithmetic operation to begin immediately after data has become available in the storage unit 316 or 318. The delay unit 308 provides a suitable time delay for the completion of the arithmetic operation and the storage operation, to be described hereinafter, and then passes the range pulse to the counter 298 which then updates the number of the next range bin and also operates the switches 314A-B for the entry of data in the alternate one of the storage units 316 and 318.

The data controller 72 further comprises a delay unit 348, a switch 350, a memory 352, an arithmetic unit 354 and a storage unit 356. The memory 352 is of the form known as a random access memory (RAM) wherein in response to an address provided on line 358, data may be read in and read out from the particular portions of the memory 352 as designated by the address on line 358. The switch 350 has its contactor 360 in the position shown in the drawing except for the relatively short interval of time, to be described hereinafter, when the output signal of the counter 304 is passed via the delay unit 348 to the switch 350. It is thus seen that during the gathering of data via the counters 300 and 302, the number appearing on the line 336 from the counter 298 is applied via the switch 350 and line 358 to serve as the address for the memory 352. The output of the delay unit 306 serves the dual function of a write signal to command the entry of data into the memory 352 and as a command signal to the arithmetic unit 354. The storage unit 356, which may comprise a register such as that of the storage units 316 and 318, is triggered by the range pulses on line 330 to store data presented on line 362 by the memory 352 in accordance with the address on line 358. The arithmetic unit 354 sums together the number on line 346 with the number stored in the storage unit 356 and provides this sum as input data via line 364 to the memory 352, this input data going in the very same part of the memory 352 from which the data on line 362 was previously extracted. The function of the delay unit 306 now becomes more clearly understood in that the range pulse on line 330 is applied to the storage unit 356 before it is applied via the delay unit 306 to the arithmetic unit 354. In this way, the data in the portion of the memory 352 corresponding to the range bin number on line 336 can be updated for each transmission of sonic energy along the beam 26 of FIG. 1.

The data controller 72 also comprises a timing unit 366, a gate 368, a counter 370, a comparator 372, a refresh memory 374 and a digital-to-analog converter hereinafter referred to as converter 376. As has been mentioned previously, the counter 304 provides an output pulse upon attaining a count of 2500, this pulse being applied to both the flip-flop 324 and to the switch 350 via the delay unit 348 and line 378. The duration of the pulse on line 378 is sufficient to permit a transference of the data stored in the memory 352 to the refresh memory 374. During the presence of the pulse on line 378, the contactor 360 is in the alternate position from that shown in the drawing so that the address on line 358 is now provided by the counter 370 via line 380 and the switch 350. Clock signals from the clock 66 are provided along line 74 to the timing unit 366 which, in turn, provides clock pulse signals on line 382 which are applied to the gate 368, to the counter 370 and to the Z axis of the display 40. The pulse on line 378 serves to open the gate 368 to permit the passage of the clock pulse signals from line 382 to line 384, the clock pulse signals on line 384 serving as a write command to the refresh memory 374 for the entry of data presented on line 362.

With reference to the timing diagram of FIG. 7A, the fourth line of the timing diagram shows the occurrences of the signals on the lines 342, 344 and 330 for the entry of data in the storage units 316, 318 and 356, the signals being seen to coincide with the range pulses in the eighth line of the timing diagram. The pulse produced by the counter 304 representing the maximum echo range to be considered is seen in the sixth line of the timing diagram. The first of the series of clock pulses to appear on line 384 for updating the refresh memory 374 is seen on the seventh line of the timing diagram. The delay between the updating signal on line 7 and the immediately preceding range pulse on line 8 is provided by the delay 348, this delay being sufficiently long to ensure that the updating of the refresh memory occurs subsequently to the data store commands of line 4 and the arithmetic commands of line 5 of the timing diagram.

The counter 370 counts the clock pulse signals on line 382 modulo-250 at a sufficiently high counting rate to count through all the 250 range bins within the duration of the pulse on line 378. The count of the counter 370 appearing on line 380 is also applied to the refresh memory 374 for addressing the refresh memory 374 in coincidence with the addressing of the memory 352. In this way, data read into the refresh memory 374 along line 362 is stored in the bin of the refresh memory 374 corresponding to the similarly addressed bin of the memory 352. The output of the refresh memory 374 is continuously available to the converter 376 which converts the digital numbers stored in the refresh memory 374 to analog signals which are applied via cable 92 to the Y axis of the display 40. It is noted that the address counter 370 is continuously receiving clock pulse signals on line 382 independently of the condition of the gate 368. Thus, it is seen that the counter 370 is continuously recycling through the addresses of the 250 bins in the refresh memory for updating the data to be presented on the Y axis of the display 40, this data corresponding to the vertical bars of the record 44 on the face 42 of the display 40 as seen in FIGS. 1 and 2. It is only during the opening of the gate 368 that a write signal appears on line 384 for updating the refresh memory 374. The X-axis signal for the display 40 is provided by the comparator 372 which compares the address on line 380 with the number appearing on line 326, the latter number having been described previously as representing the present location of the ship 20 of FIG. 1. Thus, whenever the address on line 380 coincides with the present location of the ship 20, the comparator 372 generates the X-axis signal for synchronizing the X-axis deflection of the display 40. In this way, the display 40 is space stabilized in accordance with the position of the ship 20.

Referring now to FIG. 8, there is seen an alternative embodiment of the invention utilizing only the forward looking sonar 28, here designated by the label 28A, which has been modified to include a hoist 386 for raising or lowering a support 388 which positions the transducer 222 and transducer array 224 beneath the ship 20. The hoist comprises a lifting motor 390 coupled via a pinion 392 and ratchet 394 through a splined collar 396 to a connecting rod 398 for raising and lowering the support 388 through a well 400 in the ship 20. A second motor 402 is coupled to the splined collar 396 for rotating the support 388 in azimuth. The support 388 is pivotally connected via pivot 404 to the connecting rod 398 for selecting a desired elevation angle for the transducer 222 and the transducer array 224. The hoist 386 permits a positioning of the support 388 to optimize radiation along the beam 26 by positioning and orienting the beam 26 as to minimize the chance of reverberations from the surface 62 and bottom 46 of the ocean 22. The forward looking sonar 28A also comprises the electronic unit 192 and the correlator 86, previously seen in FIG. 5, and a graphical recorder 406 comprising a moving belt 408 and a stylus 410 which moves across the belt 408 in a direction perpendicular to the motion of the belt 408. The output signals from the correlator 86 are coupled to the stylus 410 for recording the signals. Belt drums 412 are mechanically connected to the drive shaft 414 of the ship's propellor 416 so that the movement of the belt 408 is synchronized with the speed of the ship 20. As is well known, such graphical recorders are provided with a switch 418 which is activated by the passes of the stylus 410 to provide a suitable key signal for activating the forward looking sonar 28A in the manner previously discussed with reference to FIG. 5. The switch 418 is coupled via line 420 to the electronic unit 192 and connects with line 84 of FIG. 5 for gating the electronic unit 192. Successive signals from the correlator 86 are seen to accumulate along the same portion of the belt 408 upon successive passes of the stylus 410 in view of the synchronization between the drums 412 and the drive shaft 414. Accordingly, the picture presented on the graphical recorder 406 is similar to that presented on the display 40 of FIGS. 1 and 2.

It is understood that the above-described embodiments of the invention are illustrative only and that modifications thereof will occur to those skilled in the art. Accordingly, it is desired that this invention is not

What is claimed is:

1. A sonar system comprising:
   a transducer system;
   means for positioning said transducer system between two boundaries of a layer of fluid, said transducer system including means for adapting said transducer system to produce a beam of radiant energy wherein the sides of the beam are substantially parallel to said boundaries, said positioning means including means for rotating a beam of energy emanating from said transducer system for directing said beam of radiation between said boundaries; and
   means responsive to a speed of movement of said transducer system through said fluid for storing data obtained through the reception of radiant energy by said transducer system.

2. A system according to claim 1 wherein said storing means includes means for correlating signals received by said transducer system with a reference.

3. A system according to claim 2 wherein said transducer system includes means coupled to said correlating means for generating said reference and signals to be transmitted by said transducer system.

4. A system according to claim 3 wherein said generating means includes means for generating a signal at a first carrier frequency and a signal at a second carrier frequency.

5. A system according to claim 4 wherein said transducer system converts electrical signals into signals of sonic energy, said transducer system including means for radiating energy at said first carrier frequency and radiating energy at said second carrier frequency into a common region of said fluid layer for inducing a nonlinear interaction therein between sonic energy at said first carrier frequency and sonic energy at said second carrier frequency to provide within said beam a sonic energy at a frequency different from said first frequency and said second frequency.

6. A system according to claim 5 wherein said storing means includes a graphical recorder, said sonar system is transported by a ship driven by a rotating propeller, and said graphical recorder is coupled to said rotating propellor for advancing a recording medium at a speed proportional to a speed of movement of said ship.

7. A display system comprising:
   first means for providing echo ranging signals in a first direction;
   second means for providing echo ranging signals in a second direction having a component parallel to said first direction and a component perpendicular to said first direction;
   means coupled to said second means for extracting doppler data from echo ranging signals of said second means;
   means coupled to said first means for storing data obtained from echo ranging signals of said first means, said storing means including means coupled to said doppler extracting means for repositioning data stored within said data storing means, said repositioning providing a correspondence between a position of said first means relative to a source of echoes of said echo ranging signal; and
   means coupled sequentially to portions of said storing means for portraying said stored data.

8. A system according to claim 7 wherein said data storing means comprises bins for the storing of data, any one of said bins storing data of echoes emanating from sources of echoes located within a region spaced a predetermined distance from said first means, said system comprising means coupled to said doppler extracting means for weighting data stored in each of said bins in accordance with the magnitude of the doppler frequency of said doppler data.

9. A system according to claim 8 wherein each bin overlaps a portion of the next bin for storing data emanating from sources of echoes spaced in correspondingly overlapping distances from said first means.

10. A system according to claim 9 wherein said data storing means comprises a plurality of accumulating means for simultaneously accumulating data arriving simultaneously in a pair of bins.

11. A system according to claim 10 further comprising means coupled to said second means for measuring the time elapsed between a transmission and a reception of an echo of said echo ranging signal of said second means, means coupled to said elapsed time measuring means for storing successive values of said elapsed time, means coupled to said doppler extracting means and to said elapsed time storing means for entering values of said elapsed time into said elapsed time storing means at a rate proportional to the value of said doppler frequency, and means coupled to said elapsed time storing means for computing a distance at which the elapsed time of a future one of said echoes will have a predetermined value.

12. A system according to claim 11 wherein said weighting means comprises means for providing a sequence of pulses having a predetermined number of said pulses for individual ones of echoes received by said first means of its echo ranging signal.

13. A system according to claim 12 wherein said data storing means comprises means for sequentially coupling data of said bins to said portraying means.

14. A system according to claim 13 wherein said sequential coupling means comprises memory means for periodically gathering data of said bins, said memory means being coupled to said portraying means to permit said gathered data to be displayed at a rate independent of a rate of entry of data into said bins.

15. A system according to claim 14 further comprising means coupled to said first means for counting successive echoes of said echo ranging signal of said first means, means for addressing said memory means, and means coupled to said counting means and said memory addressing means for triggering said portraying means to portray data of said memory means.

16. A correlation system comprising:
   means for transmitting ranging signals, said transmitting means including means for modulating said ranging signals;
   means for receiving reflections of said ranging signals;
   means coupled to said transmitting means and to said receiving means for correlating modulation of received reflections with the modulation of said transmitted ranging signals; and
   means synchronized with said transmissions of said ranging signals and coupled to said correlating means for summing together a sequence of output signals of said correlating means wherein successive signals of said sequence correspond to successive transmissions of said ranging signals.

17. A system according to claim 16 wherein said summing means is responsive to a speed of movement of said transmitting means for summing an output signal of said correlator occurring at a shifted interval of time, the amount of said shifted interval of time being proportional to said speed of movement.

18. A system for navigating a vehicle traveling through a medium, said system comprising:
means for measuring the distance between said vehicle and a boundary of said medium;
a memory for storing values of distance;
means for reading out from said measuring means and into said memory, at a rate proportional to a speed of travel of said vehicle, values of distance measured by said measuring means; and
means coupled to said memory for computing an average slope of said boundary from said stored distance measurements to provide the range to an intersection of a path of travel of said vehicle with an extension of a boundary line having said average slope.

19. A system according to claim 18 further comprising means for measuring said speed of travel, said speed measuring means being coupled to said reading means to provide said reading rate proportional to said speed of travel.

20. A system for navigating a vehicle through a medium, said system comprising:
means for measuring range from said vehicle to objects submerged in said medium, said measuring means including means for illuminating said objects with a beam of radiant energy, said measuring means providing range measurements of objects positioned relative to said vehicle so as to be illuminated by said beam;
means coupled to said range measuring means for displaying a summation of successive ones of said range measurements for each of said objects, a value of an individual one of said summations for an individual one of said objects being retained when said illumination by said beam terminates; and
means for measuring a speed of travel of said vehicle, said speed measuring means being coupled to said range measuring means for signaling said range measuring means to initiate a range measurement after a predetermined increment in travel of said vehicle whereby said summations are presented on said display means at regular intervals corresponding to said increments in vehicle travel.

21. A system according to claim 20 wherein said display means further comprises means for storing a summation of said successive range measurements for one of said objects after said one object is positioned relative to said vehicle to lie outside said beam of radiant energy.

22. A system according to claim 21 further comprising means coupled to said speed measuring means for weighting said range measurements to increase the value of said summations inversely with the speed of said vehicle.

23. A system for navigating a vehicle in a medium, said system comprising:
means responsive to the range between said vehicle and an object in said medium for storing a range measurement of said object;
means coupled to said storing means for displaying said range measurement;
means responsive to a speed of travel of said vehicle for addressing said storage means for selecting a storage bin corresponding to the location of said object; and
means coupled to said storage means for replacing a stored range measurement in an addressed bin with the sum of said range measurement and a subsequent range measurement.

24. A system for navigating a vehicle through a medium, said system comprising:
means for measuring range from said vehicle to objects submerged in said medium, said measuring means including means for illuminating said objects with a beam of radiant energy, said measuring means providing range measurements of objects positioned relative to said vehicle so as to be illuminated by said beam;
means for displaying a summation of successive ones of said range measurements for each of said objects, a value of an individual one of said summations for an individual one of said objects being retained when said illumination by said beam terminates;
means for coupling range measurements from said range measuring means to said display means; and
means for measuring a speed of travel of said vehicle, said speed measuring means being connected to said coupling means for initiating a coupling of one of said range measurements after a predetermined increment in travel of said vehicle whereby said summations are presented on said display means at regular intervals corresponding to said increments in vehicle travel.

25. A system for processing depth data of a medium in accordance with the travel of a vehicle through the medium, the system comprising:
means responsive to a measuring of depth for storing successive values of said depth data;
a source of clock signals;
means responsive to a speed of said travel for scaling a pulse repetition frequency of said clock signals in accordance with the magnitude of said speed;
a memory having a plurality of bins; and
means driven by said scaled clock signals for coupling individual values of said stored depth data into individual ones of said bins at intervals of time proportional to increments of said travel to provide an array of depth measurements corresponding to successive locations of said vehicle.

* * * * *